(12) United States Patent
Deng et al.

(10) Patent No.: US 10,695,910 B2
(45) Date of Patent: Jun. 30, 2020

(54) AUTOMATIC CALIBRATION METHOD FOR ROBOT SYSTEM

(71) Applicants: Tyco Electronics (Shanghai) Co. Ltd., Shanghai (CN); TE Connectivity Corporation, Berwyn, PA (US)

(72) Inventors: Yingcong Deng, Shanghai (CN); Dandan Zhang, Shanghai (CN); Roberto Francisco-Yi Lu, Berwyn, PA (US); Yun Liu, Shanghai (CN); Lvhai Hu, Shanghai (CN); Lei Zhou, Shanghai (CN)

(73) Assignees: Tyco Electronics (Shanghai) Co. Ltd., Shanghai (CN); TE Connectivity Corporation, Berwyn, PA (US)

( * ) Notice: Subject to any disclaimer, the term of this patent is extended or adjusted under 35 U.S.C. 154(b) by 328 days.

(21) Appl. No.: 15/904,772

(22) Filed: Feb. 26, 2018

(65) Prior Publication Data

US 2018/0243912 A1    Aug. 30, 2018

Related U.S. Application Data

(63) Continuation of application No. PCT/IB2016/054946, filed on Aug. 18, 2016.

(30) Foreign Application Priority Data

Aug. 26, 2015  (CN) .......................... 2015 1 0530295

(51) Int. Cl.
  *B25J 9/16*  (2006.01)
(52) U.S. Cl.
  CPC ........... *B25J 9/1692* (2013.01); *B25J 9/1697* (2013.01); *G05B 2219/39008* (2013.01);
  (Continued)

(58) Field of Classification Search
  None
  See application file for complete search history.

(56) References Cited

U.S. PATENT DOCUMENTS

| 6,434,449 B1 | 8/2002 | De Smet |
| 2011/0046782 A1 | 2/2011 | Fixell |
| (Continued) | | |

FOREIGN PATENT DOCUMENTS

| EP | 06555301 A1 | 11/1994 |
| WO | 2015121767 A1 | 8/2015 |

OTHER PUBLICATIONS

PCT Notification, The International Search Report and the Written Opinion of the International Searching Authority, dated Nov. 2, 2016, 12 pages.

*Primary Examiner* — Bhavesh V Amin
(74) *Attorney, Agent, or Firm* — Barley Snyder

(57) ABSTRACT

An automatic calibration method for a robot system comprises providing a ball-rod member including a connection rod and a sphere connected to a first end of the connection rod, fixing an opposite second end of the connection rod to an end execution tool mounted on a flange of a robot, and controlling the robot to move a center of the sphere to a same target point in a plurality of different poses under the guidance of a vision sensor. A transformation matrix of the center of the sphere with respect to a center of the flange is calculated based on pose data of the robot at the same target point. A transformation matrix of a center of the end execution tool with respect to the center of the flange is calculated according to a formula.

7 Claims, 1 Drawing Sheet

(52) U.S. Cl.
    CPC .............. *G05B 2219/39026* (2013.01); *G05B 2219/39054* (2013.01); *G05B 2219/39398* (2013.01); *G05B 2219/40607* (2013.01); *Y10S 901/09* (2013.01); *Y10S 901/47* (2013.01)

(56) References Cited

U.S. PATENT DOCUMENTS

2018/0243912 A1* 8/2018 Deng ..................... B25J 9/1692
2019/0022867 A1* 1/2019 Deng ..................... B25J 9/1692

\* cited by examiner

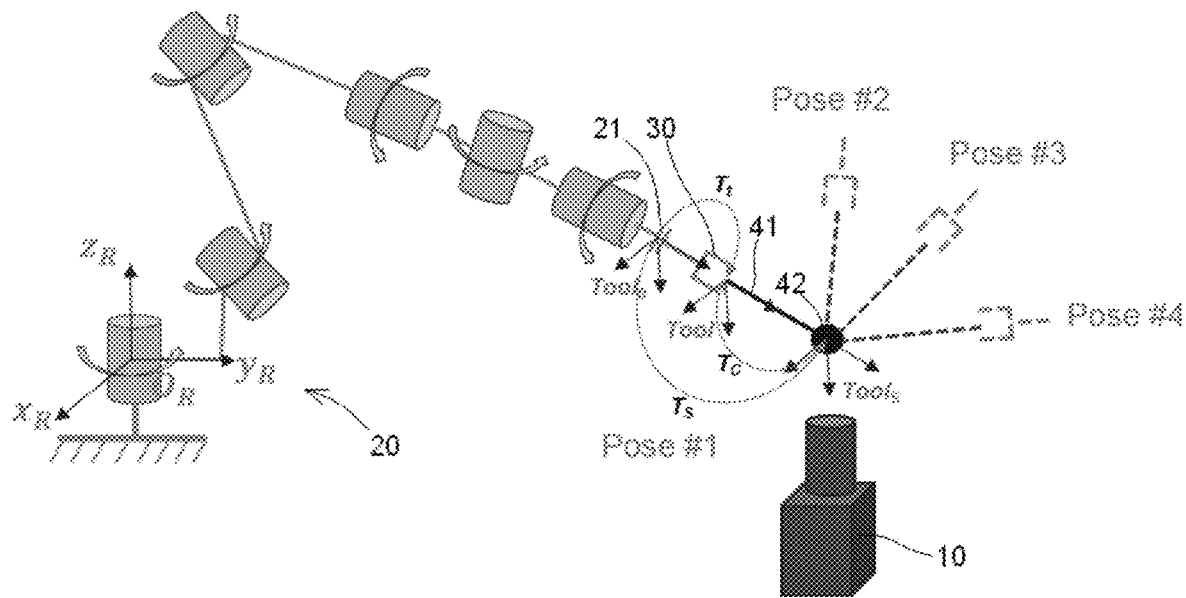

AUTOMATIC CALIBRATION METHOD FOR ROBOT SYSTEM

CROSS-REFERENCE TO RELATED APPLICATIONS

This application is a continuation of PCT International Application No. PCT/IB2016/054946, filed on Aug. 18, 2016, which claims priority under 35 U.S.C. §119 to Chinese Patent Application No. 201510530295.8, filed on Aug. 26, 2015.

FIELD OF THE INVENTION

The present invention relates to a robot system and, more particularly, to an automatic calibration method for a robot system.

BACKGROUND

Know calibration methods for robot systems generally involve artificial teaching. For example, an operator manually controls a robot of the robot system to move an end execution tool mounted on a flange of the robot to reach the same target point with a plurality of different poses (for a 6-axis robot, generally with four or more different poses). The operator must visually determine whether the tool is moved to the same target point, and consequently, calibration errors arise leading to inaccurate tool usage. A transformation matrix of the center of an end execution tool with respect to the center of the flange of the robot is inaccurate. Furthermore, it is extremely time-consuming to repeatedly manually control the robot to reach the same target point and visually verify the movement, greatly decreasing work efficiency. Moreover, the robot system must be re-calibrated every time the end execution tool is replaced, adding to the time burden.

It is also known to automatically calibrate a robot system based on a calibrated vision sensor. In the automatic calibration method, the robot is controlled to move the center of the end execution tool mounted on the flange of the robot to the same one target point in various different poses. The automatic calibration method greatly saves time and effort compared with the method of visually judging whether the end execution tool is moved to the target point. However, in the known automatic calibration method, it is necessary to identify the center of the end execution tool using the vision sensor. Generally, the end execution tool has a very complex geometric structure and it is difficult to identify the center of the end execution tool. More particularly, when frequent replacement of the end execution tool is necessary, the vision sensor needs to re-identify the center of the end execution tool every time the end execution tool is replaced, which is also very troublesome and time-consuming.

SUMMARY

An automatic calibration method for a robot system comprises providing a ball-rod member including a connection rod and a sphere connected to a first end of the connection rod, fixing an opposite second end of the connection rod to an end execution tool mounted on a flange of a robot, and controlling the robot to move a center of the sphere to a same target point in a plurality of different poses under the guidance of a vision sensor. A transformation matrix of the center of the sphere with respect to a center of the flange is calculated based on pose data of the robot at the same target point. A transformation matrix of a center of the end execution tool with respect to the center of the flange is calculated according to a formula.

BRIEF DESCRIPTION OF THE DRAWINGS

The invention will now be described by way of example with reference to the accompanying Figures, of which:

FIG. 1 is a perspective view of a robot system according to an embodiment.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

A robot system according to an embodiment is shown in FIG. 1. In the shown embodiment, the robot system is a 6-axis robot system. In other embodiments, the robot system may be any multi-freedom robot system, for example, a four-axis robot system or a five-axis robot system. The robot system has a vision sensor 10, a robot 20 having a flange 21, and an end execution tool 30 mounted on the flange 21 of the robot 20.

In order to calibrate the robot system, as shown in FIG. 1, a ball-rod member 41, 42 is fixed to the end execution tool 30. The ball-rod member 41, 42 has a connection rod 41 and a sphere 42 connected to a first end of the connection rod 41. An opposite second end of the connection rod 41 is fixed to the end execution tool 30 mounted on the flange 21 of the robot 20. As shown in FIG. 1, a center axis of the connection rod 41 passes through the center of the sphere 42.

Geometric parameters of the connection rod 41 and the sphere 42 of the ball-rod member 41, 42 are known and constant. After the ball-rod member 41, 42 is fixed to the end execution tool 30, a transformation matrix Tc of the center Tool of the end execution tool 30 with respect to the center of the sphere 42 may be pre-obtained. Since the geometry parameters of the connection rod 41 and the sphere 42 of the ball-rod member are known and constant, the transformation matrix Tc also is known and constant.

In an embodiment, the vision sensor 10 is a camera. The camera 10 is configured to capture an image of the sphere 42 of the ball-rod member 41, 42. The camera 10 identifies an actual position of the center of the sphere 42, for example, in a vision sensor coordinate system or in a world coordinate system. In another embodiment, the vision sensor 10 is a plurality of cameras.

The robot system further comprises a controller configured to control the robot system based on a program stored in a non-transitory computer readable medium, and a processor configured to process the image data obtained by the camera 10 such that the actual position of the center of the sphere 42 may be identified.

A calibration process of the robot system will now be described with reference to FIG. 1. The calibration process comprises the steps of:

providing the ball-rod member 41, 42 comprising the connection rod 41 and the sphere 42 connected to the first end of the connection rod 41;

fixing the second end of the connection rod 41 to the end execution tool 30 mounted on the flange 21 of the robot 20;

controlling the robot 20 to move a center of the sphere 42 to the same one target point in a plurality of different poses under the guidance of the vision sensor 10. The plurality of different poses including a pose1, a pose2, a pose3, and a pose4 in the shown embodiment;

calculating a transformation matrix Ts of the center of the sphere 42 with respect to a center Tool0 of the flange 21 based on pose data of the robot 20 at the same target point; and calculating a transformation matrix Tt of a center Tool of the end execution tool 30 with respect to the center Tool0 of the flange 21 according to a following formula (1):

$$Tt=Ts * Tc \quad (1)$$

The transformation matrix Tc is a transformation matrix of the center Tool of the end execution tool 30 with respect to the center of the sphere 42, and the transformation matrix Tc is known and constant.

In the controlling step, based on a position error between an actual position of the center of the sphere 42 in a vision sensor coordinate system, sensed by the vision sensor 10, and a position of the target point in the vision sensor coordinate system, a closed-loop feedback control on the robot 20 is performed until the position error becomes zero. The closed-loop feedback control is performed on the robot 20 until the center of the sphere 42 is accurately moved to the target point.

The vision sensor 10 directly identifies the actual position of the center of the sphere 42 in the vision sensor coordinate system. The actual position of the center of the sphere 42 in the world coordinate system is indicated by X, Y, and Z values, however, the actual position of the center of the sphere 42 in the vision sensor coordinate system is indicated by U, V, and Z values, in which U and V indicate positions of pixel points, and Z indicates a diameter of the sphere 42. Thereby, in the vision sensor coordinate system, the Z value is increased with the increased diameter of the sphere 42 and decreased with the decreased diameter of the sphere 42.

The controlling step thereby includes the steps of:

controlling the robot 20 to move the center of the sphere 42 to the target point within a view field of the vision sensor 10 in a first pose pose1 under the guidance of the vision sensor 10, and obtaining a first pose data of the robot 20 at the target point;

controlling the robot 20 to move the center of the sphere 42 to the target point in a second pose pose2 under the guidance of the vision sensor 10, and obtaining a second pose data of the robot 20 at the target point;

controlling the robot 20 to move the center of the sphere 42 to the target point in a third pose pose3 under the guidance of the vision sensor 10, and obtaining a third pose data of the robot 20 at the target point;

controlling the robot 20 to move the center of the sphere 42 to the target point in a fourth pose pose4 under the guidance of the vision sensor 10, and obtaining a fourth pose data of the robot 20 at the target point; and calculating the transformation matrix Ts of the center of the sphere 42 with respect to the center Tool0 of the flange 21 based on the obtained first pose data, second pose data, third pose data and fourth pose data of the robot 20.

In other embodiments, the robot 20 may accurately move the center of the sphere 42 to the same one target point in two, three, five or more different poses.

Advantageously, since the ball-rod member 41, 42 is mounted to the flange 21 of the robot 20, only the center of the sphere 42 of the ball-rod member 41, 42 needs to be identified by the vision sensor 10. The center of the end execution tool 30 does not need to be directly identified by the vision sensor 10. Since the sphere 42 has a regular geometry, it is easy to identify its center, which improves the calibration accuracy and efficiency of the robot system.

What is claimed is:

1. An automatic calibration method for a robot system, comprising:

providing a ball-rod member including a connection rod and a sphere connected to a first end of the connection rod;

fixing an opposite second end of the connection rod to an end execution tool mounted on a flange of a robot;

controlling the robot to move a center of the sphere to a same target point in a plurality of different poses under the guidance of a vision sensor;

calculating a transformation matrix Ts of the center of the sphere with respect to a center of the flange based on pose data of the robot at the same target point; and calculating a transformation matrix Tt of a center of the end execution tool with respect to the center of the flange according to a following formula:

$$Tt=Ts * Tc,$$

wherein Tc is a transformation matrix of the center of the end execution tool with respect to the center of the sphere and is constant.

2. The method of claim 1, wherein the controlling step includes performing a closed-loop feedback control on the robot until a position error between an actual position of the center of the sphere sensed by the vision sensor in a vision sensor coordinate system and a position of the same target point in the vision sensor coordinate system becomes zero.

3. The method of claim 2, wherein the vision sensor is at least one camera and is configured to identify the center of the sphere according to an image of the sphere captured by the at least one camera.

4. The method of claim 3, wherein the controlling step includes controlling the robot to move the center of the sphere to the same target point in at least three different poses.

5. The method of claim 3, wherein the controlling step includes:

controlling the robot to move the center of the sphere to the same target point within a view field of the vision sensor in a first pose under the guidance of the vision sensor and obtaining a first pose data of the robot at the same target point;

controlling the robot to move the center of the sphere to the same target point in a second pose under the guidance of the vision sensor and obtaining a second pose data of the robot at the same target point;

controlling the robot to move the center of the sphere to the same target point in a third pose under the guidance of the vision sensor and obtaining a third pose data of the robot at the same target point;

controlling the robot to move the center of the sphere to the same target point in a fourth pose under the guidance of the vision sensor and obtaining a fourth pose data of the robot at the same target point; and calculating the transformation matrix Ts of the center of the sphere with respect to the center of the flange based on the obtained first pose data, second pose data, third pose data and fourth pose data of the robot.

6. The method of claim 1, wherein the robot is a multi-axis robot.

7. The method of claim 6, wherein the robot is a four-axis robot or a six-axis robot.

* * * * *